United States Patent
Colom Ikuno

(10) Patent No.: US 12,120,019 B2
(45) Date of Patent: Oct. 15, 2024

(54) REFERENCING LOCAL RESOURCES IN USER EQUIPMENT (UE) ROUTE SELECTION POLICY (URSP) IN A TELECOMMUNICATIONS SYSTEM

(71) Applicant: Deutsche Telekom AG, Bonn (DE)

(72) Inventor: Josep Colom Ikuno, Korneuburg (AT)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 18/574,782

(22) PCT Filed: Jun. 23, 2022

(86) PCT No.: PCT/EP2022/067151
§ 371 (c)(1),
(2) Date: Dec. 28, 2023

(87) PCT Pub. No.: WO2023/274829
PCT Pub. Date: Jan. 5, 2023

(65) Prior Publication Data
US 2024/0275717 A1    Aug. 15, 2024

(30) Foreign Application Priority Data
Jul. 1, 2021 (EP) .................................. 21183140

(51) Int. Cl.
*H04L 45/302* (2022.01)
*H04W 40/02* (2009.01)

(52) U.S. Cl.
CPC .......... *H04L 45/306* (2013.01); *H04W 40/02* (2013.01)

(58) Field of Classification Search
None
See application file for complete search history.

(56) References Cited

U.S. PATENT DOCUMENTS

| 2019/0306752 A1* | 10/2019 | Lai | H04W 28/0925 |
| 2020/0053622 A1* | 2/2020 | Huang-Fu | H04W 76/20 |
| 2022/0272031 A1* | 8/2022 | Miklós | H04W 40/02 |
| 2022/0369198 A1* | 11/2022 | Jagannatha | H04W 40/02 |

FOREIGN PATENT DOCUMENTS

| CN | 111641989 A | 9/2020 |
| WO | WO 2021019458 A1 | 2/2021 |

* cited by examiner

*Primary Examiner* — Brian S Roberts
(74) *Attorney, Agent, or Firm* — LEYDIG, VOIT & MAYER, LTD.

(57) ABSTRACT

A telecommunications system includes: a user equipment (UE); an access network (AN); and a core network (CN) composed of CN elements. A CN element comprises a set of UE route selection policy (URSP) rules, wherein each URSP rule comprises at least the following parameters: precedence value of URSP rule, a traffic descriptor, and at least a route selection descriptor containing a destination for matching traffic. The UE comprises one or more local resources which comprise: a local device or location in the UE, either physical or logical; and/or a local network address in the UE. A CN element is configured to instruct the UE with one or more URSP rules to route traffic matching the traffic descriptor to the destination local resource, local device, location or local network address in the UE. The UE is configured to direct the matching traffic to the destination in the URSP rule.

8 Claims, 3 Drawing Sheets

REFERENCING LOCAL RESOURCES IN USER EQUIPMENT (UE) ROUTE SELECTION POLICY (URSP) IN A TELECOMMUNICATIONS SYSTEM

CROSS-REFERENCE TO PRIOR APPLICATIONS

This application is a U.S. National Phase application under 35 U.S.C. § 371 of International Application No. PCT/EP2022/067151, filed on Jun. 23, 2022, and claims benefit to European Patent Application No. EP 21183140.9, filed on Jul. 1, 2021. The International Application was published in English on Jan. 5, 2023 as WO 2023/274829 A1 under PCT Article 21(2).

FIELD

The present invention relates to a method for referencing local resources in UE route selection policy (URSP) in a telecommunications system and a telecommunications system thereof.

BACKGROUND

In the current 5G system a mobile network is typically divided in two main parts: access network (AN) and core network (CN). FIG. 1 shows an exemplary 5G system comprising a user equipment (UE) 10, a radio access network (RAN) 20, a CN 30 and a data network (DN) 40, identified by a DN name (DNN), such as for example the Internet.

A mobile network provides the UE with connectivity towards a DN. Currently, to do so, the UE communicates with the RAN via a radio interface, which is used for conveying both signaling information and data traffic. In more detail, even in the case where there is a logical separation (logical channels), both types of data are transmitted over the same physical medium.

Between the RAN and the CN, signaling information and user data are separated in different interfaces: N1/N2 and N3 in the 5G case, the former running on a SCTP/NG-AP/NAS protocol stack and the latter running on a UDP/GTPU-U protocol stack. This is shown in FIG. 2, which illustrates an exemplary data transmission between the UE 10 and the DN 40.

In FIG. 2, the UE 10 is connected through the Uu interface to the gNB at the RAN. The gNB is connected, on the control plane, to the access and mobility management function (AMF) of the CN 30 via the N1/N2 interface. Further, on the user plane, the gNB is connected to the user plane function (UPF) via the N3 interface. The UPF is connected to the DN 40, on the user plane, via the N6 interface.

In order to establish a data connection for enabling a UE to communicate with a DN, a PDU session is required. A PDU session is a logical data transport channel terminated at the CN that provides connectivity to a DN. The termination point of a given PDU session (UPF in the case of FIG. 2 and how it works in 5G) is referred to as PDU session anchor (PSA). A PDU session has an associated quality-of-service (QOS) (or QoS, as several flows can be contained within the PDU session).

While a UE moves (e.g. handover), the PSA is expected to remain constant (hence the term "anchor").

FIG. 3 illustrates an example of the PDU session establishment process according to the 3GPP. As shown in FIG. 3, PDU session establishment is performed by the UE 10 via the radio interface. The RAN 20 is aware of PDU sessions because it needs the information to, for example, do physical resource allocation on Uu, but the PDU session is managed by the CN 30.

In FIG. 3, the UE sends (S1) a PDU session establishment request to the AMF through the gNB, via the Uu and N1/N2 interfaces (see FIG. 2).

The AMF exchanges (S2A) messages with the UPF to establish a N3 data path between the gNB and the UPF. The exchange of messages may involve other network functions (NFs) (e.g. session management function (SMF), policy control function (PCF)). Then, the AMF exchanges messages (S2B) with the gNB to establish an N3 data path between the gNB and the UPF.

The AMF sends (S3) a PDU session establishment response to the UE 1 via the gNB.

Lastly, data traffic is exchanged (S4A) between the UE 1 and gNB via the Uu interface (radio), exchanged (S4B) between the gNB and the UPF via the N3 interface (GTP-U tunnel), and exchanged (S4C) between the UPF and the DN 40 via the N6 interface (unencapsulated).

Currently, distinct PDU sessions are regarded as independent, i.e. a PDU session establishment is not linked to other PDU session establishment requests.

Further, in case uplink traffic (UP) needs to be steered, the 5GS also defines UE routing policies (URSPs), as defined in 3GPP TS 24.526, that allow the network to mandate the UE a set of rules on how to route packets.

The URSP is defined in 3GPP TS 23.503 and is a set of one or more URSP rules, where a URSP rule is composed of: a) a precedence value of the URSP rule identifying the precedence of the URSP rule among all the existing URSP rules: b) a traffic descriptor: and c) one or more route selection descriptors.

The traffic descriptor can include either: b1) match-all traffic descriptor: or b2) at least one of the following components: one or more application identifiers: one or more IP 3 tuples as defined in 3GPP TS 23.503 i.e. the destination IP address, the destination port number, and the protocol in use above the IP: one or more non-IP descriptors, i.e. destination information of non-IP traffic: one or more DNNs: one or more connection capabilities: and one or more domain descriptors, i.e. destination FQDN(s).

The one or more route selection descriptors each include a precedence value of the route selection descriptor and either: c1) one PDU session type and, optionally, one or more of the following: SSC mode: one or more S-NSSAIs: one or more DNNs: Void: preferred access type: multi-access preference: a time window; and location criteria: or c2) non-seamless non-3GPP offload indication.

FIG. 4 is an example of use of URSPs. In particular, URSPs can be defined as a ruleset at the UE 10 so that specific traffic can be sent via a specific traffic description (e.g. access type). According to FIG. 4, the UE 10 comprises an application 11 and a set of URSPs 12. The application 11 sends mixed traffic (A+B+C) to the URSPs 12. Here, the traffic A is separated via PDU session 1, traffic B via PDU session 2, and the rest via PDU session 3.

Thereafter, the UE 1 is able to send specific traffic A, B and C via the different PDU sessions 1, 2 and 3, to the DNN-1, DNN-2 and DNN-3, respectively, through the access networks 20-1 and 20-2 and the CN 30. It is important to note that each PDU session may use a different slice.

However, according to the state of the art, there are no real means to divert traffic within a UE to local endpoints.

URSPs route selection descriptors are currently only designed to refer to destinations related to the CN (e.g. slice, DNN, PDU session).

SUMMARY

In an exemplary embodiment, the present invention provides a telecommunications system. The telecommunications system includes: a user equipment (UE): an access network (AN): and a core network (CN) composed of CN elements. A CN element comprises a set of UE route selection policy (URSP) rules, wherein each URSP rule comprises at least the following parameters: precedence value of URSP rule, a traffic descriptor, and at least a route selection descriptor containing a destination for matching traffic. The UE comprises one or more local resources which comprise: a local device or location in the UE, either physical or logical: and/or a local network address in the UE. A CN element is configured to instruct the UE with one or more URSP rules to route traffic matching the traffic descriptor to the destination local resource, local device, location or local network address in the UE. The UE is configured to direct the matching traffic to the destination in the URSP rule, wherein the destination refers to one or more of the following: a local device or location in the UE, either physical or logical: and/or a local network address in the UE.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
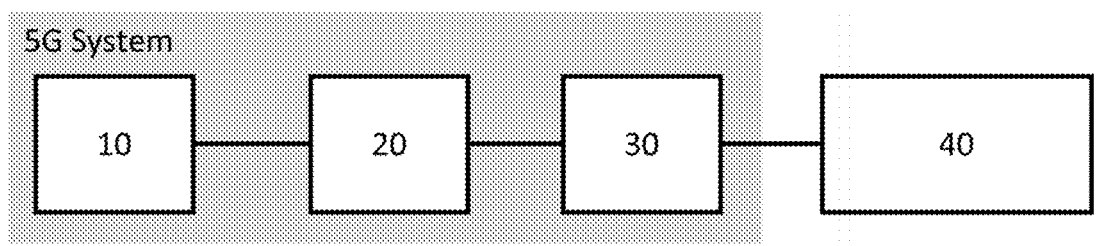
FIG. 1 illustrates an exemplary 5G system.
Figure 2:
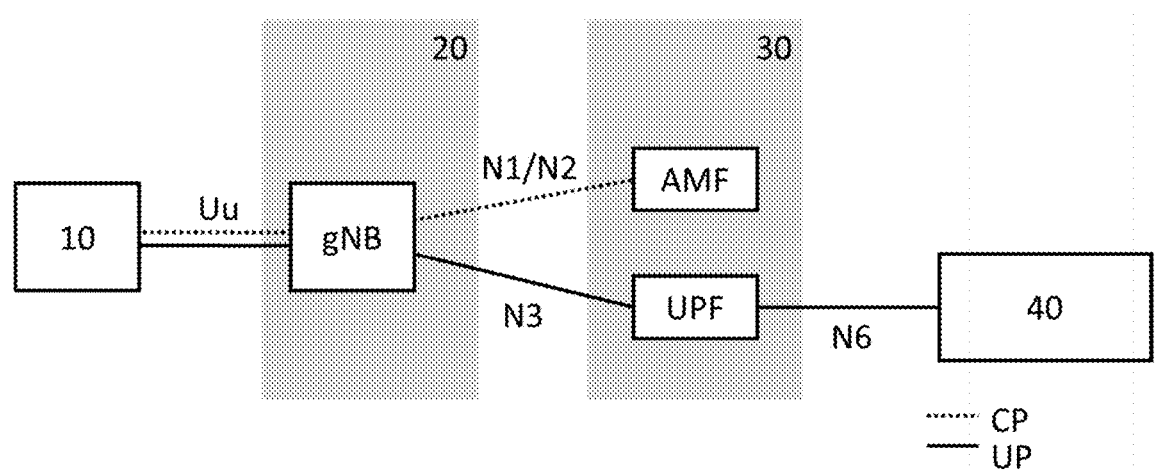
FIG. 2 illustrates an exemplary data transmission between UE and DN.
Figure 3:
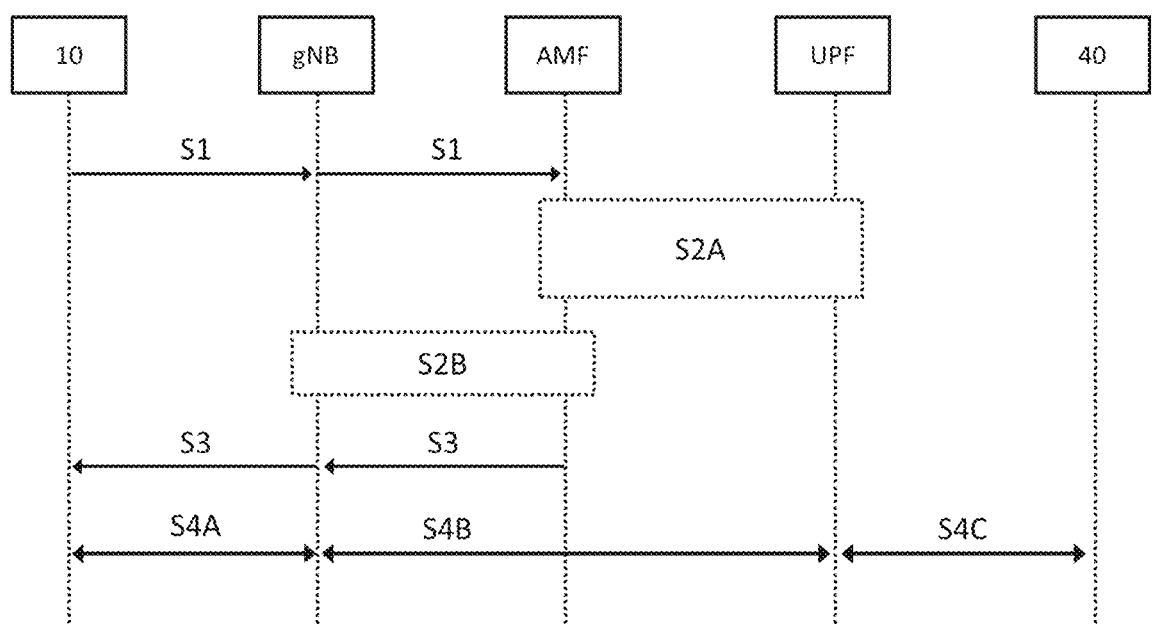
FIG. 3 illustrates an exemplary PDU session establishment process according to the 3GPP.
Figure 4:
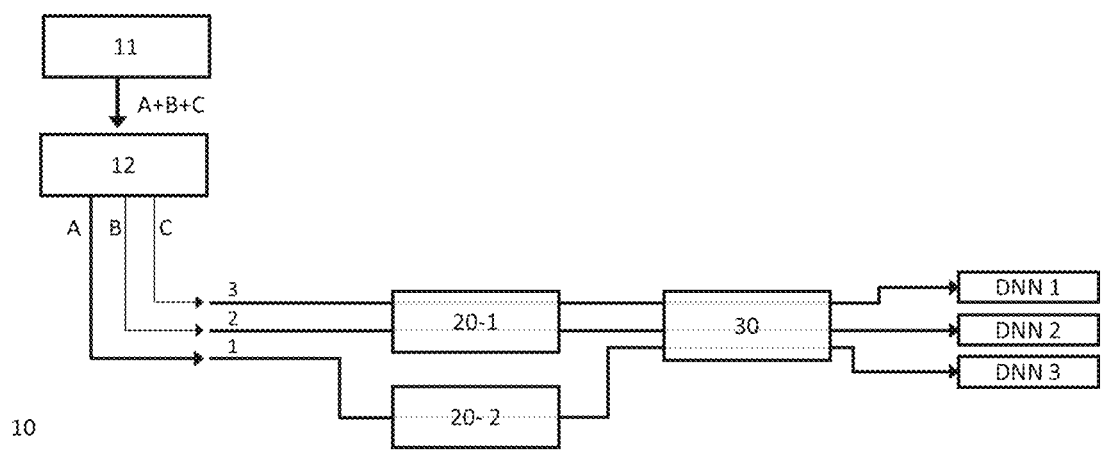
FIG. 4 illustrates an exemplary use of URSPs.

In view of the above, exemplary embodiments of the present invention enable a UE, via the use of its UE route selection policy (URSP) entries, to route traffic towards local endpoints in the UE instead of towards specific DNN/ slice(s). The following use cases may benefit from the application of this method:

Network-steered diversion of uplink traffic to a local device (e.g. network interface within the UE) instead of towards Uu and CN.

Deployment of edge applications at the UE, such that traffic from an application towards a UE edge application is locally routed instead of routed via the CN According to an aspect of the invention, there is provided a telecommunications system comprising: a user equipment (UE), an access network (AN), and a core network (CN), composed of CN elements, wherein a CN element comprises a set of UE route selection policy (USRP) rules, wherein each URSP rule comprises at least the following parameters: precedence value of URSP rule, a traffic descriptor, and at least a route selection descriptor containing a destination for matching traffic, wherein a CN element is configured to instruct the UE with one or more URSP rules to route traffic matching the traffic descriptor; and the UE is configured to route the matching traffic to the specified destination in the URSP rule, wherein the traffic destination refers to one or more of the following: a local device or location in the UE, either physical or logical: and/or a local network address in the UE.

According to another aspect of the invention, there is provided a method for referencing local resources in a user equipment route selection policy (URSP) in a telecommunications system comprising: the user equipment (UE), an access network (AN), and a core network (CN), composed of CN elements, wherein a CN element comprises a set of URSP rules, wherein each URSP rule comprises at least the following parameters: precedence value of URSP rule, a traffic descriptor, and at least a route selection descriptor containing a destination for matching traffic, the method comprising: instructing, by a CN element, the UE with one or more URSP rules to route traffic matching the traffic descriptor; routing, by the UE, the matching traffic to the specified destination in the URSP rule, wherein the traffic destination refers to one or more of the following: a local device or location in the UE, either physical or logical: and/or a local network address in the UE.

According to a preferred aspect, the traffic descriptor may contain one or more of the following parameters: a network address or address range: a service name or a range of service names: a slice ID: a data network name (DNN): a protocol data unit (PDU), session identifier: information related to a PDU session.

According to a preferred aspect, the communications system may further comprise another one or more ANs.

According to a preferred aspect, the telecommunications system is a mobile communications networks and the AN is a radio AN.

Advantageously, according to the present invention, it is possible that edge applications and applications accessing local devices and/or hardware functionally benefit from a way of diverting data traffic towards a location in the UE that is transparent to these applications.

Other aspects, features, and advantages will be apparent from the summary above, as well as from the description that follows, including the figures and the claims.

According to an embodiment of the invention, user equipment routing policies (URSPs) can be used to create a traffic matching filter in the UE 10 with the capability to direct traffic to specific data network name (DNN)/single network slice selection assistance information (S-NSSAI) combinations. In other words, a capability to direct traffic to a specific PDU session.

By adding the capability to reference local resources in URSPs, traffic can be diverted to such resources, such as, for example: local applications referenced by a network address: local applications references by an identifier known to the UE: and a local device attached to the UE.

Figure 5:
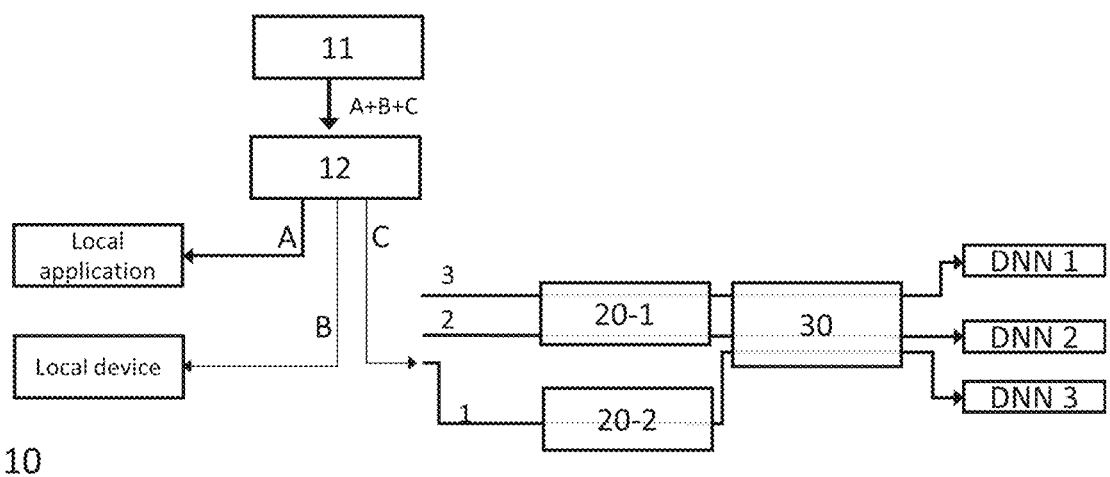
FIG. 5 illustrates an example use of URSP to divert traffic locally according to an embodiment of the invention.

FIG. 5 illustrates an example use of URSP to divert traffic locally according to an embodiment of the invention.

According to the telecommunications system of FIG. 5 the system comprises: a user equipment (UE) 10, one or more access networks (ANs) 20-1, 20-2, a core network (CN) 30, composed of CN elements, and one or more DNNs 40-1, 40-2, 40-3.

A CN element comprises a set of UE route selection policy (USRP) rules. Each URSP rule comprises at least the following parameters: precedence value of URSP rule, a traffic descriptor, and at least a route selection descriptor containing a destination for matching traffic.

The CN element instructs the UE with one or more URSP rules to route traffic matching the traffic descriptor.

The UE 10 stores the one or more URSP rules.

Then, the UE 10 routes the matching traffic to the specified destination in the URSP rule, wherein the traffic destination refers to one or more of: a local device or location in the UE, either physical or logical: and/or a local network address in the UE.

Referring to FIG. 5, the application 11 may send mixed traffic A+B+C and apply the URSPs 12. For example, the traffic may comprise sending traffic A to local application; sending traffic B to a local device: and/or sending traffic C via the AN 20-2.

While the invention has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made by those of ordinary skill within the scope of the following claims. In particular, the present invention covers further embodiments with any combination of features from different embodiments described above and below.

Furthermore, in the claims the word "comprising" does not exclude other elements or steps, and the indefinite article "a" or "an" does not exclude a plurality. A single unit may fulfill the functions of several features recited in the claims. The terms "essentially", "about", "approximately" and the like in connection with an attribute or a value particularly also define exactly the attribute or exactly the value, respectively. Any reference signs in the claims should not be construed as limiting the scope.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A telecommunications system comprising:
   a user equipment (UE);
   an access network (AN); and
   a core network (CN) composed of CN elements;
   wherein a CN element comprises a set of UE route selection policy (URSP) rules, wherein each URSP rule comprises at least the following parameters: precedence value of URSP rule, a traffic descriptor, and at least a route selection descriptor containing a destination for matching traffic;
   wherein the UE comprises one or more local resources which comprise:
      a local device or location in the UE, either physical or logical; and/or
      a local network address in the UE:
   wherein a CN element is configured to instruct the UE with one or more URSP rules to route traffic matching the traffic descriptor to the destination local resource, local device, location or local network address in the UE; and
   wherein the UE is configured to direct the matching traffic to the destination in the URSP rule, wherein the destination refers to one or more of the following:
      a local device or location in the UE, either physical or logical; and/or
      a local network address in the UE.

2. The telecommunications system of claim 1, wherein the traffic descriptor contains one or more of the following parameters:
   a network address or address range;
   a service name or a range of service names;
   a slice ID;
   a data network name (DNN);
   a protocol data unit (PDU) session identifier;
   information related to a PDU session.

3. The telecommunications system of claim 1, wherein the communications system further comprises another one or more ANs.

4. The telecommunications system of claim 1, wherein the telecommunications system is a mobile communications network, and the AN is a radio AN.

5. A method for referencing local resources in a user equipment route selection policy (USRP) in a telecommunications system comprising the user equipment (UE), an access network (AN), and a core network (CN) composed of CN elements, wherein a CN element comprises a set of USRP rules, wherein each URSP rule comprises at least the following parameters: precedence value of URSP rule, a traffic descriptor, and at least a route selection descriptor containing a destination for matching traffic,
   wherein the UE comprises one or more local resources which comprise:
      a local device or location in the UE, either physical or logical; and/or
      a local network address in the UE,
   wherein the method comprises:
   instructing, by a CN element, the UE with one or more URSP rules to route traffic matching the traffic descriptor to the destination local resource, device, location or network address in the UE;
   directing, by the UE, the matching traffic to the destination in the URSP rule, wherein the destination refers to one or more of the following:
      a local device or location in the UE, either physical or logical; and/or
      a local network address in the UE.

6. The method of claim 5, wherein the traffic descriptor contains one or more of the following parameters:
   a network address or address range;
   a service name or a range of service names;
   a slice ID;
   a data network name (DNN);
   a protocol data unit (PDU) session identifier;
   information related to a PDU session.

7. The method of claim 5, wherein the telecommunications system further comprises another one or more ANs.

8. The method of claim 5, wherein the telecommunications system is a mobile communications network, and the AN is a radio AN.

\* \* \* \* \*